United States Patent [19]

Dove

[11] Patent Number: 4,847,884
[45] Date of Patent: Jul. 11, 1989

[54] DENTAL X-RAY FILM CUSHIONING DEVICE

[75] Inventor: S. Brent Dove, San Antonio, Tex.

[73] Assignee: Board of Regents, The University of Texas System, Austin, Tex.

[21] Appl. No.: 15,261

[22] Filed: Feb. 17, 1987

[51] Int. Cl.⁴ .............................................. A61B 6/14
[52] U.S. Cl. .................................. 378/168; 378/167; 433/229
[58] Field of Search .............................. 378/167–170; 433/215, 229

[56]  References Cited

U.S. PATENT DOCUMENTS

| | | | |
|---|---|---|---|
| 2,010,281 | 8/1935 | Valkenburg | 378/168 |
| 2,035,051 | 3/1936 | Daly | 378/170 |
| 2,525,959 | 10/1950 | Shapiro | 378/170 |
| 2,614,225 | 10/1952 | Shapiro | 378/169 |
| 2,736,814 | 2/1956 | Lederman et al. | 378/168 |
| 3,304,423 | 2/1967 | Medwedeff | 378/168 |
| 3,444,371 | 5/1969 | Via, Jr. | 378/168 |
| 3,936,643 | 2/1976 | Toner | 378/168 |
| 4,104,532 | 8/1978 | Weiss | 250/490 |
| 4,193,002 | 3/1980 | Muether et al. | 250/479 |
| 4,295,050 | 10/1981 | Linden | 378/170 |
| 4,344,182 | 8/1982 | Bostic | 378/170 |
| 4,593,401 | 6/1986 | Colbert | 378/168 |
| 4,626,216 | 12/1986 | Strong-Grainger | 378/168 |

OTHER PUBLICATIONS

"Edge-Ease" Brochure.

Primary Examiner—Craig E. Church
Assistant Examiner—John C. Freeman
Attorney, Agent, or Firm—Arnold, White & Durkee

[57] ABSTRACT

A method and device for use in combination with a dental x-ray film for reducing the pain, discomfort or tissue trauma associated with the emplacement of such a film into the oral cavity of a patient, the device comprising a tubular member formed of a soft, resilient nontoxic material, the member having an axially extending slot which extends radially into the member, the slot adapted to receive an edge of a dental x-ray film therein.

8 Claims, 1 Drawing Sheet

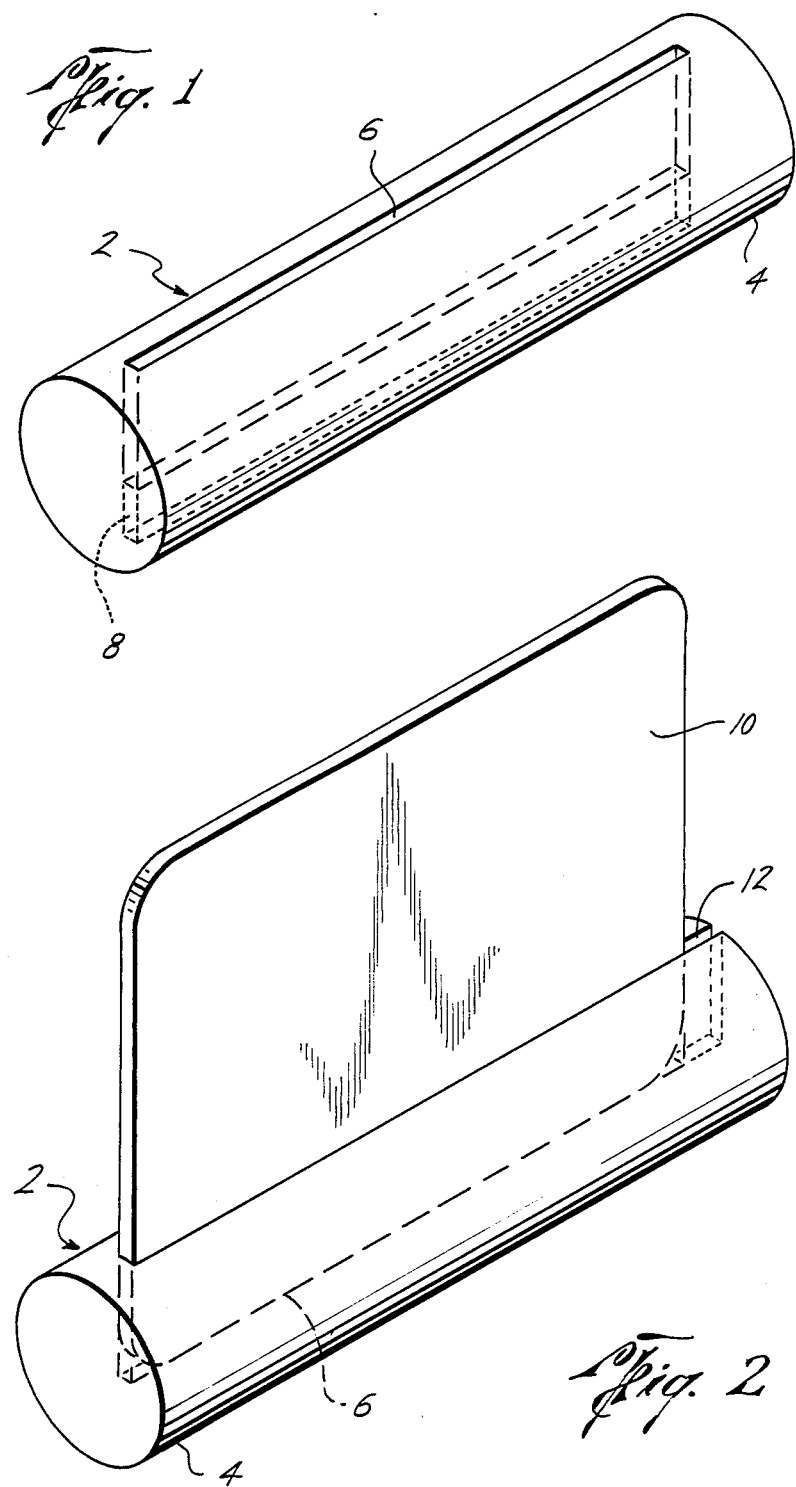

DENTAL X-RAY FILM CUSHIONING DEVICE

BACKGROUND OF THE INVENTION

1. Field of the Invention

The present invention relates to a device for preventing the pain, discomfort or tissue trauma associated with the oral cavity emplacement of dental x-ray films. More particularly, the invention relates to a tubular member formed of a soft, resilient non-toxic material, for fitting along the edge of such a film to protect the oral cavity from pain and discomfort.

2. Description of the Related Art

The use of x-ray technology in the field of dentistry has provided dental science with a fast, inexpensive and reliable means of obtaining information regarding the structural integrity of teeth and supporting tissues. Although various methods and apparati are known for obtaining dental x-rays, by far the most common method employs a relatively small x-ray film disposed within a film carrier that serves to protect the film from exposure to light while allowing the passage of x-rays. These film packets thus permit the exposure of the enclosed film when it is subjected to x-rays. Accordingly, the packaged x-ray film is inserted into a patient's mouth, and the film exposed by passing x-rays through the tooth and onto the emplaced film packet.

A common problem which is associated with the use of such x-ray film packets is the pain, discomfort or tissue trauma which results from the emplacement of the film packets into the oral cavity of the patient. This discomfort is both an unpleasant experience for the patient, and further can result in a reduction in clarity of the resultant x-ray caused by the patient's attempts to relieve the discomfort. Moreover, placement of the film packet can produce lacerations to the oral mucosa. This latter consideration is of particular importance in the case of very young patients where patient compliance is generally more of a problem.

One device known to the art which attempts to address the foregoing problems is sold under the brand name EDGE-EASE tissue protectors. This device consists of a backing member having an adhesive applied to one side and a foam material applied to the opposite side. The device is folded around the lower edge of the film and adhered by means of the adhesive, thus leaving the foam surface exposed to thus serve a tissue protective function.

Unfortunately, the EDGE-EASE device is cumbersome and often difficult to use due to a need to remove a paper liner which covers the adhesive. The liner must be removed and the adhesive backing correctly aligned along the lower edges of the film packet. The device must then be torn away from the film packet after use to access the film, a requirement which can possibly lead to tearing of the film. Due to the relatively small amount of foam backing, the device does not provide sufficient protection to alleviate the discomfort of some particularly sensitive patients. Moreover, in that the device employs an adhesive backing and thus must be torn away in order to be removed from the film, the device is subsequently not reusable.

Accordingly, there is a need for a protective or cushioning device which is not only simple to use, inexpensive and effective but, further, which can be readily applied and removed from the x-ray film packet and re-used if so desired.

SUMMARY OF THE INVENTION

It is therefore an object of the present invention to provide a device for use in conjunction with a dental X-ray film, or film packet, to eleviate the pain, discomfort or tissue trauma associated with the emplacement of such a film into the oral cavity of a patient undergoing dental X-rays.

It is a further object of the present invention to provide such a device that is simple to use, inexpensive and effective, but further which can be readily applied to and removed from the X-ray film packet and reused if so desired.

It is still a further object of the present invention to provide such a device which is made of a material that is sterilizable.

Accordingly, in its most general and overall scope, the present invention is directed to a device for use in combination with a dental X-ray film for reducing the pain, discomfort or tissue trauma associated with the emplacement of such a film into the oral cavity of a patient, the device comprising a tubular member formed of a soft, resilient nontoxic material, the member having an axially extending slot which extends radially into the member, the slot adapted to receive an edge of a dental X-ray film therein. The device may be formed of any of a number of resilient nontoxic materials, such as polyurethane foam, silicone foam, polyethylene foam, highly plasticized polyvinylchloride (PVC), silicone gel, and the like. Other foams or non-forms having suitable elastic and/or plastic properties to ensure comfort and minimal toxicity can be used.

The axially extending slot is typically of a dimension that will allow the film to be placed in the slot and received snugly. That is, typically the slot will be of a slightly smaller length than the film edge to be inserted, thereby allowing the resilient nature of the material to grip the inserted film snugly.

Members of the sort above described can be made of any length to accommodate X-ray films, or X-ray film packets, of varying dimensions. If so desired, a suitable size indicator can be printed along the edge of the member to indicate the size film for which it is designed. Alternatively, site indication may be made through coloring and thereby color-coding the device.

Further if desired, the slot may be coated with an adhesive material to allow a firm adherence of the film to the member. This may be particularly desirable where the film packet is sold as a unit which bears the slotted member along one of its edges. For such purposes, it may be desirable to leave an open slot through one axial end of the member to allow access to the film once the film has been exposed.

The present invention is therefore further directed to an apparatus for use in taking dental X-rays, the apparatus comprising a dental X-ray film in combination with the foregoing device.

In still further embodiments of the present invention, a kit is provided for use in taking dental X-rays wherein the kit comprises a dental x-ray file and the foregoing device.

The present invention is further directed to a method of reducing the pain, discomfort or tissue trauma associated with the emplacement of a dental X-ray film into the oral cavity of a patient wherein the method includes the steps of:

(a) obtaining a device which includes a tubular member formed of a soft, resilient material, the member having an axial extending slot which extends radially into the member, the slot adapted to receive an edge of a dental X-ray film therein;

(b) fitting an edge of a dental X-ray film to be so emplaced into the slot; and (c) emplacing the film and associated member into the patient's oral cavity.

BRIEF DESCRIPTION OF THE DRAWINGS

FIG. 1 is a prospective view of the device of the present invention.

FIG. 2 is prospective view of the device of the present invention having an X-ray film inserted therein.

DETAILED DESCRIPTION OF THE INVENTION

Referring now to FIG. 1 is shown a device 2 for use in combination with dental X-ray film for reducing the pain, discomfort or tissue trauma associated with the emplacement of such a film into the oral cavity of a patient. The device 2 is comprised of a tubular member 4 formed of a soft, resilient non-toxic material, wherein the member 4 has an axially extending slot 6 which extends radially into the member, the slot being adapted to receive an edge of a dental X-ray film therein.

The slot 6 is typically of a dimension which is slightly smaller in length than the length of the edge of the dental X-ray film to be inserted. By forming the slot of a slightly smaller size than the film to be inserted, one can obtain a device which will snugly fit around the edges of the film to thereby hold the film firmly into the device.

Also shown in FIG. 1 by the dotted lines 8, is the fact that the slot 6 may be radially extended all the way through the member. Thus, the slot 6 may either be formed to extend into the interior or alternatively extend all the way throgh the body of the member 4.

Although the member 4 is shown in roughly cylindrical shape, there is no requirement that the device be cylindrical as such. The device can take many shapes and still function in accordance with the present invention, for example, the device may be formed as a square, octagonal, rectangle, triangle, oval, u-shaped or any other shape which will allow the member 4 to be snugly fit onto the film edge and yet provide sufficient comfort to the patient when the film is emplaced in contact with the gingiva or oral mucosa.

Referring now to FIG. 2 is shown the device 2 comprised of a member 4 formed of a soft, resilient non-toxic material, the member having an axially extending slot 6 with a X-ray film 10 inserted therein.

As noted previously, for certain applications one may desire to provide an apparatus for taking dental X-rays which includes both the dental X-ray film itself together with the protective device of the present invention. For such applications it may be desirable to provide the member 4 with a slot 6 wherein the region of the member which defines the slot is coated with an adhesive material so as to allow adherence of the member to the inserted dental X-ray film. This will prevent inadvertent loosening of the film or film packet from the protective device during transit or storage. For such applications it will generally be desirable to provide a further slot 12 at an axial end of the member to allow access to the film within the film packet after the film has been exposed.

Use of the present tissue protective device is quite simple. The x-ray film edge is placed into the slot drawing the edges of the region of the member which defines the slot up around the edges of the film to provide a snug fit. The device and emplaced X-ray film are then placed into the patients mouth, and the x-ray taken. The exposed film and device are then removed from the oral cavity of the patient, the protective device removed from the edge of the exposed film, and the film removed from the packet. The device can then be either sterilized and reused or alternatively simply discarded.

Where the device is provided as a unit together with the film as discussed above, one would simple place the entire unit into the mouth, take the X-ray, remove the combined device, remove the film from the film packet by means of the provided axial slot 12 and discard the entire unit after use.

The member 4 may be formed of any material which is soft and resilient and non-toxic. For example, polyurethane foam, silicone foam, polyethylene foam, highly plasticized PVC, and silicone gel are all believed to work well in the regard. Polyurethane foam has been found to work particularly well. Moreover, rolled cotton has been employed successfully. However, any foam or non-foam having suitable elastic and/or plastic properties to ensure comfort and non- toxicity could be used.

The materials, of course, must be sterilizable in order to be employed within the human oral cavity. However, virtually any material is sterilizable, either by autoclaving or by radiation sterilization. For repeated reuse of such a member in the context of a dental office, it may be desirable to formulate the member of polyurethane foam. This may be desirable in that most dental offices have an autoclave readily available for sterilization, polyurethane being sterilizable by autoclaving.

As noted, the device may be fabricated in various sizes to correspond to the various sizes of dental X-rays films available.

Moreover, the device can be flavored or colored to any desirable taste or color to improve their aesthetic character and to improve their acceptance by a patient. Coloring may be employed as a means of color coding the various sizes to readily indicate the size film for which the particular device is adapted to fit.

The device may be fabricated by any technique known in the art for the fabrication of small tubular members formed of foam or non-foam materials of the type mentioned. For example, injection molding or blow-molding are believed to work well in this regard.

The foregoing description has been directed to particular embodiments of the invention in accordance with the requirements of the patent statutes for the purposes of illustration and explanation. It will be apparent, however, to those skilled in this art in this art that many modifications and changes in the device and procedure set forth will be possible without departing from the scope and spirit of the invention. It is intended that the following claims be interpreted to embrace all such modifications and changes.

What is claimed is:

1. A device for use in combination with a dental X-ray film for reducing the pain, discomfort or tissue trauma associated with the emplacement of such a film into the oral cavity of a patient, the device consisting essentially of a tubular cushion, longitudinally extending about an axis, formed of a soft, resilient, non-toxic material, the cushion having an axially extending resilient slot which extends radially into the cushion, wherein the slot snugly receives an edge of a dental X-ray film therein.

2. The device of claim 1 wherein the axially extending slot extends radially completely through the cushion.

3. The device of claim 1 wherein a region of the cushion which defines the slot is coated with an adhesive material so as to allow adherence of the cushion to an inserted dental x-ray film.

4. The device of claim 1 wherein the cushion is sterile.

5. The device of claim 1, further comprising a dental X-ray film, wherein an edge of said film is inserted into said slot.

6. An apparatus for use in taking dental X-rays, the apparatus comprising a dental X-ray film in combination with a device for reducing the pain, discomfort or tissue trauma associated with the emplacement of such a film into an oral cavity of a patient, the device consisting essentially of a tubular cushion, longitudinally extending about an axis, formed of a soft, resilient, non-toxic material, the cushion having an axially extending resilient slot which extends radially into the tubular cushion, wherein the slot snugly receives an edge of a dental X-ray film therein.

7. A kit for use in taking dental x-rays, the kit comprising:

(a) a dental X-ray film; and (b) a device for reducing the pain, discomfort or tissue trauma associated with the emplacement of such a film into an oral cavity of a patient, the device consisting essentially of a tubular cushion, longitudinally extending about an axis, formed of a soft, resilient, non-toxic material, the cushion having an axially extending resilient slot which extends radially into the cushion, wherein the slot snugly receives an edge of a dental X-ray film therein.

8. A method for reducing the pain, discomfort or tissue trauma associated with the emplacement of a dental X-ray film into an oral cavity of a patient, the method comprising the steps of:

(a) obtaining a device which consists essentially of a tubular cushion, longitudinally extending about an axis, formed of a soft, resilient material, the cushion having an axially extending resilient slot which extends radially into the cushion, wherein the slot snugly receives an edge of a dental X-ray film therein;

(b) fitting an edge of a dental X-ray film to be so emplaced in the slot; and (c) emplacing the film and the tubular cushion into the patient's oral cavity.

* * * * *